United States Patent Office 3,503,576
Patented Mar. 31, 1970

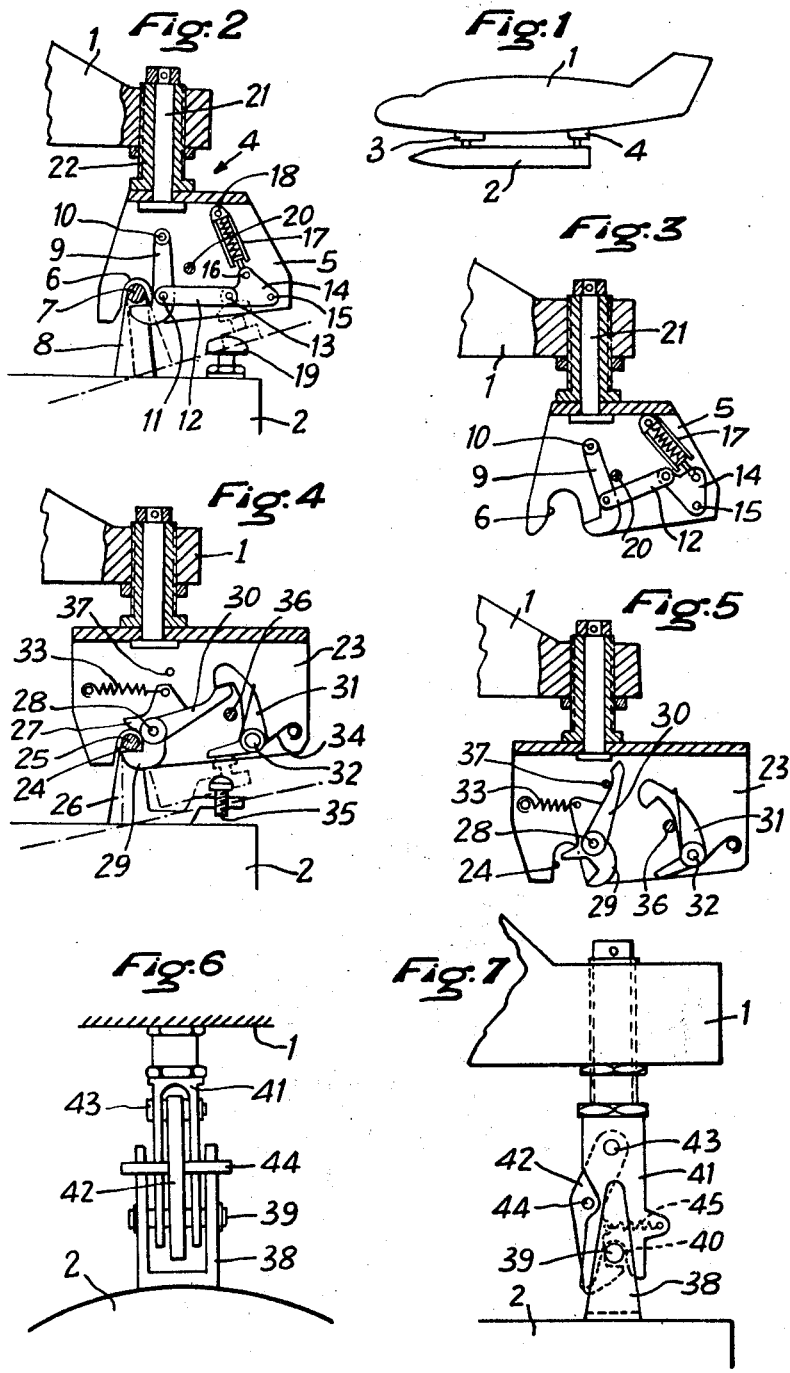

3,503,576
AUTOMATIC-RELEASE RETAINING DEVICE FOR JETTISONABLE AIRCRAFT CARGO
Henri Louis Victor Savarieau, Montgeron, France, assignor to R. Alkan & Cie, Paris, France, a corporation of France
Filed Aug. 9, 1968, Ser. No. 751,440
Claims priority, application France, Nov. 10, 1967, 127,709
Int. Cl. B64d 1/12
U.S. Cl. 244—137                     3 Claims

ABSTRACT OF THE DISCLOSURE

The invention relates to a load jettisoning device for aircraft, in which the release of the forward portion of the load causes the tilting of its rear portion which engages, by a projecting member, a device rigid with the aircraft and retaining the rear portion of the load, thus causing the aperture of this retaining device and the ejection of the load in a determined angular position.

This invention relates to cargo jettisoning devices for aircraft cargo and has specific references to automatic-release retaining means for devices of this general character.

It is known, in arrangements designed for jettisoning loads or cargo from an aircraft, to provide retaining means secured preferably to the rear of the load or cargo and adapted, when the load is ejected, to cause a forward tilting thereof about said retaining means and bring the load to a predetermined degree of inclination suitable for the jettisoning thereof. The function of the aforesaid retaining device is to release the load when the latter has attained said predetermined angular position.

It is the object of the present invention to provide a retaining device for jettisonable aircraft load which is simple of design, capable of warranting a complete safety of the load locking means in the transport position of said load, adapted to be released automatically when the load has attained said predetermined angular jettisoning position, and permits an easy adjustment of this position.

The load-retaining means according to this invention comprise essentially a substantially bow-shaped gripping member rigid with the load which is adapted to co-act with a latch member carried by the aircraft and responsive to locking means, and a projecting member carried by said load and adapted, when the load, during its tilting movement, attains a predetermined angular position by pivoting about the point of mutual engagement between said gripping member and said latch member, to actuate said latch member for unlocking same and release the load.

For a better understanding of the invention typical forms of embodiment thereof will now be described more in detail with reference to the accompanying diagrammatic drawing in which:

FIGURE 1 is a lateral view showing very diagrammatically the manner of securing a jettisonable load to an aircraft;

FIGURES 2 and 3 are part-sectional, part-elevational views showing a first form of embodiment of the retaining device of this invention in the locked position and in the release position, respectively;

FIGURES 4 and 5 are views similar to FIGURES 2 and 3, respectively, showing another form of embodiment of the retaining device;

FIGURE 6 is a front elevational view showing a third form of embodiment of the retaining device, and FIGURE 7 is a side view of the arrangement shown in FIGURE 6.

Referring to FIGURE 1, the reference numeral 1 designates an aircraft having a jettisonable load 2 suspended from its lower portion. This load 2 has its front end secured to the aircraft by means of a known jettisoning device 3 controlled by the pilot and at its tail end a retaining device 4 constituting the subject-matter of this invention.

In FIGURES 2 and 3 a first form of embodiment of the retaining device 4 is illustrated; it comprises a strap 5 secured by its upper portion to the aircraft and formed at the lower edges of its side flanges with semi-circular notches 6 engaged by a cross-member 7 carried by the upper end of another upstanding strap 8 rigid with the tail portion of the load 2. This cross-member 7 is adapted to be locked in the notches 6, in the transport position of said load 2, by means of a latch member or lever 9 having its upper end pivoted at 10 to the strap 5 and a hook-shaped lower end engageable under the cross-member 7 for keeping this member in said semi-circular notches 6. The lever 9 is pivotally connected at 11 to a link 12 extending substantially at right angles thereto and pivoted in turn at 13 to a substantially triangular plate 14 pivoted at 15 to the strap 5 and attached by its upper end, at 16, to one end of a return spring 17 having its opposite end 18 anchored to the upper portion of strap 5.

At its upper portion, lightly astern of the strap 8, the load 2 carries a projecting member 19. When the jettisoning device 3 (FIGURE 1) is actuated to release the front portion of load 2, the latter pivots about the cross-member 7 until it attains an inclined position for example as shown in dash-and-dot lines in FIGURE 2, in which the aforesaid projecting member 19 strikes the link 12 and triangular plate 14 at the level of their common pivot 13.

As a consequence of its engagement by the projecting member 19, the triangular plate 14 rotates about its pivot 15 and pulls through the medium of link 12 the latch lever 9 which rotates in turn (see FIGURE 3) about its pivot pin 10 until it abuts against a stud 20 carried by the strap 5. This angular movement of lever 9 releases the cross-member 7 and permits the jettisoning of the load in the desired inclined position.

It will be readily understood that it is an easy matter to calculate beforehand the angle of inclination of the load when its complete release takes place. In fact, it is only necessary to properly adjust the distance by which said member 19 projects above the load 2. To this end, the member 19 may consist of a screw-rod adapted to be screwed in the load 2.

It is known that after the front end of the load has been released strong air currents tend to impart disorderly lateral movements to this load which would most likely damage the rear retaining device, if the latter were rigidly secured to the aircraft. A certain lateral play may be permitted to this retaining device, by mounting the strap 5 rigid with a pivot pin 21 rotatably mounted in a socket 22 rigid with the aircraft; preferably, this socket is externally screw-threaded to permit the vertical adjustment of the position of the complete retaining and release device with respect to the aircraft.

In FIGURES 4 and 5 of the drawing another possible form of embodiment of the release device is illustrated; it comprises a strap 23, preferably pivotally mounted on the aircraft as in the preceding form of embodiment, which is formed with a notch 24 engageable by the cross-member 25 of a strap 26 rigid with the load 2. A plate 27 fulcrumed at 28 to the strap 23 is adapted, with its hook-shaped end 29, to lock the cross-member 27 in said notch 24. An arm 30 rigid with said plate 27 is adapted on the other hand to engage a latch-forming bell-crank lever 31 fulcrumed at 32 to said strap 23. Return springs 33 and 34 connect the plate 27 and lever 31 respectively to said strap 23.

The load strap 26 carries at its rear end a projection 35 adapted, when the front portion of load 2 is released, to engage and move the lower arm of lever 31, so that this lever 31 is rotated in the clockwise direction as seen in the figure, thus releasing the arm 30 (FIGURE 5) which, due to the tension of spring 33, pivots in turn until it engages a stop 37 and causes the hook-shaped end 29 to release the cross-member 25 and thus free the load 2. When the load 2 has been released, the lever 31 engages the stop 36.

It is clear that as in the preceding case the degree of inclination of the load 2 which eventually unlocks the device is controlled by the height of the member 35 in relation to strap 26, this inclination being adjusted by screwing in or out the screw member 35 in the strap 26.

Reference will now be made to FIGURES 6 and 7 illustrating a further form of embodiment of the release device. The load 2 carries at its tail end a strap 38 provided with a cross-member 39 adapted, in the normal load-transport position, to abut against the bottom of a notch 40 formed in a forked support 41 pivotally mounted (as in the preceding forms of embodiment) on the aircraft 1. The cross-member 39 is retained in said notch 40 by a latch member 42 having its upper end pivoted at 43 to the support 41. This latch member 42 is provided with transverse studs or fingers 44 and urged to its locked position by a spring 45.

After its front end has been released, the load 2 pivots about the cross-member 39 and the upper ends of strap 38 connected to the load 2 move the transverse studs or fingers 44 of latch 42 to open said latch. When the angle of inclination of the load has attained a sufficient, predetermined value, the latch 42 releases the cross-member 39 and the load is totally released from the aircraft.

In this specific form of embodiment, the degree of inclination of the load which is necessary for releasing same is adjusted by varying the position of studs or fingers 44 on latch 42.

The strap 38 is fastened automatically to the tail release device by simply engaging this strap thereagainst, the cross-member 39 engaging the support 41 to push back the latch 42 which is returned to its locking position by the spring 45 so as to retain the cross-member 39.

As clearly apparent from the above description, it will be seen that no relative movement of the load with respect to the device, except the necessary tilting movement, is required for releasing the load.

Although the present invention has been described in conjunction with preferred embodiments, it is to be understood that various modifications may be resorted to without departing from the spirit and scope of the invention, as those skilled in the art will readily understand. Such modifications are considered to the purview and scope of the invention and appended claims.

What I claim is:

1. In an arrangement for jettisoning cargo or load from the lower portion of an aircraft, of the type comprising a front jettisoning device disposed at the front end of the load and responsive to release control means operable by the aircraft pilot, and a rear retaining device disposed at the rear end of the load and adapted to be operated automatically when said load, as a consequence of the tilting movement thereof resulting from the release of said front jettisoning device, has attained a predetermined angular position in relation to the aircraft, a retaining device of the type set forth, which comprises a strap of inverted-U cross-sectional contour, which is pivotally mounted about a substantially vertical axis to said aircraft, a pair of substantially semi-circular registering notches formed adjacent the front end of said strap in the lateral flanges thereof, a substantially bow-shaped member rigidly secured to the top of the rear end of said load and adapted to engage said notches with its upper transverse portion, a hook-shaped latch member pivotally mounted to said strap, between said flanges, and adapted to engage and retain said transverse portion of said bow-shaped member in said notches, a link pivoted at one end to said latch member and at the other end to a substantially triangular plate fulcrumed on said flanges, the pivots of said link and the fulcrum of said triangular plate being substantially aligned in the load-retaining position of the device, a return spring pivotally attached to said strap and constantly urging said triangular plate to its position normally keeping said latch member in locking engagement with said transverse portion of said bow-shaped member rigid with the load, an abutment on said strap for limiting the angular movement of said latch member, and a projecting member adjustably secured to said load shortly astern of said bow-shaped member and adapted, when said load, upon release of said front jettisoning device, tilts forwards beyond said predetermined angular position, to engage the pivotal connection between said link and said triangular plate for producing a knee-action in said link-and-plate assembly and thus causing said latch member to release said bow-shaped member and therefore said load.

2. In an arrangement for jettisoning cargo or load from the lower portion of an aircraft, of the type comprising a front jettisoning device disposed at the front end of the load and responsive to release control means operable by the aircraft pilot, and a rear retaining device disposed at the rear end of the load and adapted to be operated automatically when said load, as a consequence of the tilting movement thereof, resulting from the release of said front jettisoning device, has attained a predetermined angular position in relation to the aircraft, a retaining device of the type set forth, which comprises a strap of inverted-U cross-sectional contour, which is pivotally mounted about a substantially vertical axis to said aircraft, a pair of substantially semi-circular registering notches formed adjacent the front end of said strap in the lateral flanges thereof, a gripping member rigidly secured to the upper rear end of said load and comprising a substantially bow-shaped front portion and a heel portion carrying a knock-off member adjustably mounted therein, said substantially bow-shaped front portion of said gripping member being adapted to engage said notches in the load-retaining position of the device, a latch member fulcrumed on said strap between said flanges and having a hook-shaped portion and a radial retaining arm, a first spring constantly urging said latch member to its release position, a bell-crank lever also fulcrumed on said strap between said flanges and adapted with one arm to engage said radial retaining arm for normally holding said latch member in its load-retaining position, and with the other arm to register with said knock-off member, another spring constantly urging said bell-crank lever to its position of engagement of said radial retaining arm, and abutment means on said strap for limiting the permissible angular movements of said latch member and bell-crank lever, whereby, upon release of said front jettisoning device, and when said load has thus been allowed to tilt forwards beyond said predetermined angular position, the engagement of said other arm of said bell-crank lever by said knock-off member can cause the rotation of said lever in the direction to free said latch member and to permit the rotation of said latch member by said first spring to its load-releasing position.

3. In an arrangement for jettisoning cargo or load from the lower portion of an aircraft, of the type comprising a front jettisoning device disposed at the front end of the load and responsive to release control means operable by the aircraft pilot, and a rear retaining device disposed at the rear end of the load and adapted to be operated automatically when said load, as a consequence of the tilting movement thereof resulting from the release of said front jettisoning device, has attained a predetermined angular position in relation to the aircraft, a retaining device of the type set forth, which comprises a fork-shaped strap having an integral shank pivotally mounted on the aircraft about a substantially vertical axis, a pair of registering, substantially semi-circular notches formed in the front edges of the lateral members of said fork-shaped strap, a transverse pivot mounted in said lateral members adjacent the upper pivoted end of said lateral members, a depending latch member fulcrumed on said pivot, formed with a hook-shaped lower end and provided with rigid lateral studs extending substantially horizontally on either side thereof, a return tension spring having one end attached to said fork-shaped strap and the other end attached to said depending latch member so as to constantly urge said lateral studs into said notches, and an upstanding, U-shaped strap rigidly secured to said load, provided with a rigid cross member adapted, in the latched position of the device, to be engaged from beneath by said hook shaped lower end of said latch member, the lateral flanges of said upstanding strap extending on either side and externally of said lateral members of said aircraft-carried fork-shaped strap, whereby, upon release of said front jettisoning device, and when said load has thus been allowed to tilt forwards beyond said predetermined angular position, the engagement of said lateral studs by the upper portion of said U-shaped strap rigidly secured to said load can cause the rotation of said latch member in the direction to release said cross member and therefore said load.

References Cited

UNITED STATES PATENTS 3,008,376  11/1961  Brunow et al. ____ 244—137 X

MILTON BUCHLER, Primary Examiner

J. E. PITTENGER, Assistant Examiner

U.S. Cl. X.R.

74—2